United States Patent
Lo

(10) Patent No.: US 9,544,237 B1
(45) Date of Patent: Jan. 10, 2017

(54) METHOD AND APPARATUS FOR INSERTING IDLE BYTES IN A DATA STREAM

(71) Applicant: Marvell International Ltd., Hamilton (BM)

(72) Inventor: William Lo, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 69 days.

(21) Appl. No.: 14/522,306

(22) Filed: Oct. 23, 2014

Related U.S. Application Data

(60) Provisional application No. 61/894,714, filed on Oct. 23, 2013.

(51) Int. Cl.
  *H04L 12/833* (2013.01)
  *H04L 12/801* (2013.01)
  *H04L 12/815* (2013.01)
(52) U.S. Cl.
  CPC .............. *H04L 47/31* (2013.01); *H04L 47/12* (2013.01); *H04L 47/22* (2013.01)
(58) Field of Classification Search
  None
  See application file for complete search history.

(56) References Cited

U.S. PATENT DOCUMENTS

| | | | | |
|---|---|---|---|---|
| 8,873,579 B1* | 10/2014 | Lo | ........................... | H04L 12/28 370/338 |
| 2005/0041695 A1* | 2/2005 | Bordogna | ............. | H04J 3/0632 370/528 |
| 2005/0058150 A1* | 3/2005 | Boles | .................... | H04L 12/413 370/445 |
| 2008/0115037 A1* | 5/2008 | Effenberger | .......... | H04L 1/0057 714/758 |
| 2010/0014566 A1* | 1/2010 | Mezer | .................... | H04B 10/40 375/220 |
| 2010/0111081 A1* | 5/2010 | Diab | ....................... | H04L 12/12 370/389 |
| 2015/0016466 A1* | 1/2015 | Lin | ......................... | H04L 47/38 370/412 |

OTHER PUBLICATIONS

IEEE Std. 802.3™—2002, "Part 3: Carrier sense multiple access with collision detection (CSMA/CD) access method and physical layer specifications," IEEE Computer Society, *The Institute of Electrical and Electronics Engineers, Inc.*, 1538 pages (Mar. 8, 2002).

(Continued)

*Primary Examiner* — Yemane Mesfin
*Assistant Examiner* — Peter Chen

(57) ABSTRACT

In a method of transferring a plurality of data packets from a media access control (MAC) layer device to a physical layer (PHY) device, interpacket gaps (IPGs) having a number $N_I = N_{block}*n-(p \bmod Nblock)$ of idle bytes are inserted between packets, where p is an integer denoting a length of a data packet in bytes, $N_{block}$ is a blocking size in bytes, and n is an integer initialized to one and incremented every time q data bytes of the data packet are transferred. The parameter n is reset to one in connection with each IPG insertion.

20 Claims, 7 Drawing Sheets

(56) References Cited

OTHER PUBLICATIONS

IEEE Std 802.3-2002, "IEEE Standard for Information technology—Telecommunications and information exchange between systems—Local and metropolitan area networks—Specific requirements, Part 3: Carrier sense multiple access with collision detection (CSMA/CD) access method and physical layer specifications," *The Institute of Electrical and Electronics Engineers, Inc.* (Mar. 8, 2002).

IEEE Std 802.3-2005, "IEEE Standard for Information technology—Telecommunications and information exchange between systems—Local and metropolitan area networks—Specific requirements, Part 3: Carrier sense multiple access with collision detection (CSMA/CD) access method and physical layer specifications," *The Institute of Electrical and Electronics Engineers, Inc.*, Sections 1-5 (Dec. 9, 2005).

IEEE Draft P802.3ae/D5.0 Supplement to Carrier Sense Multiple Access with Collision Detection (CSMA/CD) Access Method & Physical Layer Specifications—Media Access Control (MAC) Parameters, Physical Layer, and Management Parameters for 10 Gb/s Operation *The Institute of Electrical and Electronics Engineers, Inc.* (May 1, 2002).

Chen, "Home Network Basis: Transmission Environments and Wired/Wireless Protocols," Prentice Hall, 26 pages (Jul. 2003).

\* cited by examiner

600a

| C | D | D | T | I | I | I | I |
|---|---|---|---|---|---|---|---|

602a 604a 606a 608a 610a 612a 614a 616a 618a p mod 8 = 2
IPG = 6

| C | D | D | T | I | I | I | I |
|---|---|---|---|---|---|---|---|

602b 604b 606b 608b 610b 612b 614b 616b 618b p mod 8 = 2
IPG = 14

| C | I | I | I | I | I | I | I | I |
|---|---|---|---|---|---|---|---|---|

METHOD AND APPARATUS FOR INSERTING IDLE BYTES IN A DATA STREAM

CROSS-REFERENCES TO RELATED APPLICATIONS

This disclosure claims the benefit of the U.S. Provisional Patent Application No. 61/894,714, entitled "Tag Insertion with Minimum Overclocking," filed on Oct. 23, 2013.

FIELD OF THE DISCLOSURE

The present disclosure relates generally to communication networks and, more particularly, to reducing bandwidth and overclocking associated with tagged data packets.

BACKGROUND

A conventional Ethernet packet is formed by 8 bytes of preamble then followed by at least 64 bytes of payload and then separated by an interpacket gap (IPG). It is advantageous to add additional tag bytes to each packet to help with internal switch and switch fabric operations. A packet to which tag bytes are added will be referred to herein as a tagged packet.

Since a tagged packet requires more bandwidth than a conventional packet, the ports in the switch fabric are generally overclocked so that the ports can keep up with the traffic rates seen on the network. However overclocking requires more power consumption. Hence it is advantageous to minimize the overclocking required.

One technique that may be used to reduce the amount of overclocking required is to "steal bandwidth" from the preamble by substituting some of the preamble bytes with the tag bytes. Another technique is to "steal bandwidth" by reducing the IPG between packets. In 10GBASE-R, 100GBASE-R, and 100GBASE-P Ethernet networks, for example, a physical coding sublayer (PCS) in a physical layer (PHY) poses some challenges in restricting how the IPG can be reduced.

SUMMARY

At least some embodiments described in the present disclosure generally relate to methods and apparatus for reducing an interpacket gap (IPG) to help, for example, reduce transmission bandwidth and/or overclocking associated with tagged packets.

In an embodiment, a method of transferring, from a media access control (MAC) layer device to a physical layer (PHY) device, a plurality of data packets includes setting a parameter n to have an initial value of one, and transferring, from the MAC layer device to the PHY device, the plurality of data packets. The method also includes, for each data packet, incrementing the parameter n if q data packet bytes are transferred, wherein q is a second parameter. For each data packet to be transferred, the method further includes setting a number of idle bytes $N_I$ of an IPG having $N_I = N_{block}*n-(p \bmod N_{block})$ idle bytes, wherein p is an integer denoting a length of the data packet in bytes and Nblock is a blocking size in bytes. The method further includes inserting IPGs of length $N_I$ bytes between successive data packets in the plurality of data packets, and resetting the parameter n to one in connection with each IPG insertion.

In another embodiment, an apparatus includes a media access control (MAC) layer device and a physical layer (PHY) device. The PHY device is coupled to the MAC layer device and the PHY device has one or more integrated circuit devices. The one or more integrated circuit devices are configured to set a parameter n to have an initial value of one, and to receive, from the MAC layer device, a plurality of data packets. For each data packet, the parameter n is incremented if q data packet bytes are received, wherein q is a second parameter. The apparatus is further configured to set, for each data packet to be received, a number of idle bytes $N_I$ for an IPG having $N_I = N_{block}*n-(p \bmod N_{block})$ idle bytes. The apparatus is further configured to insert IPGs of length $N_I$ bytes between successive data packets in the plurality of data packets, and reset the parameter n to one in connection with each IPG insertion.

BRIEF DESCRIPTION OF THE DRAWINGS

FIG. 6a is a schematic illustration of idle bytes inserted into a data stream, according to an embodiment.

FIG. 6b is another schematic illustration of idle bytes inserted into a data stream, according to an embodiment.

Like reference symbols in the various drawings indicate like elements.

DETAILED DESCRIPTION

Figure 1:
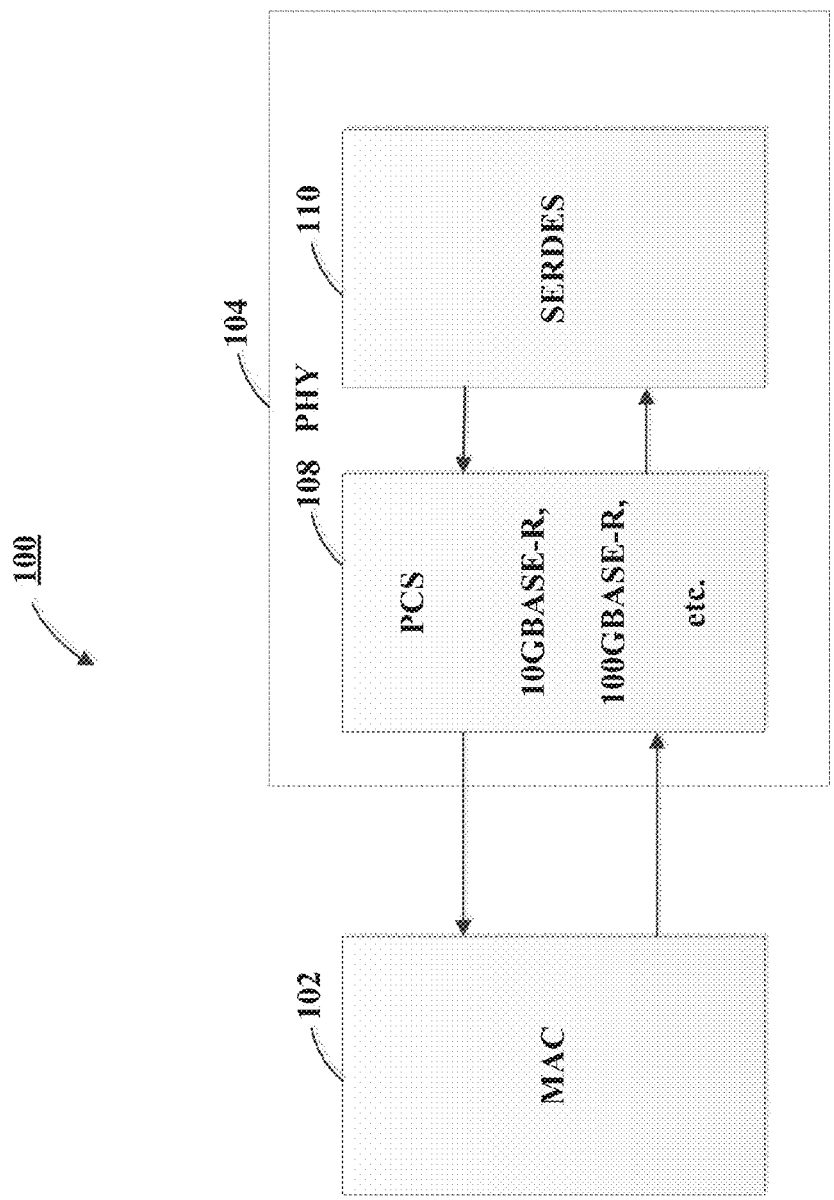
FIG. 1 is a block diagram of an example network interface device having a media access control (MAC) layer device and a physical layer (PHY) device, the network interface device utilizing processing techniques of the present disclosure, according to an embodiment.

FIG. 1 is a block diagram of an example network interface device 100 comprising a media access control (MAC) layer device 102 and a physical layer (PHY) device 104 utilizing processing techniques of the present disclosure, according to an embodiment. In an embodiment, the PHY device 104 is configured to interface with a copper PHY medium or media. In other embodiments, the PHY device 104 is configured to interface with a different suitable PHY medium, such as an optical fiber, a radio frequency wireless medium, etc. In an embodiment, the MAC layer device 102 is configured to communicate with the PHY device 104 in accordance with one or more suitable media-independent interfaces, at a data rate corresponding to the respective interface. In the example network interface device 100 of FIG. 1, the MAC layer device 102 and the PHY device 104 are configured to communicate using at least the 100 gigabit media independent interface (CGMII). In embodiments in which the MAC layer device 102 is configured to communicate with the PHY device 104 at multiple data rates, the data rate selected for communications between the MAC layer device 102 and the PHY device 104 is determined as a result of a negotiation process (e.g., an autonegotiation process conducted between the PHY device 104 and another PHY device not shown in FIG. 1).

A conventional Ethernet packet is formed by 8 bytes of preamble then followed by at least 64 bytes of payload. When transmitted, Ethernet packets are typically separated from other packets by an interpacket gap (IPG). In at least some embodiments, it is advantageous to add additional tag bytes to each packet to help with internal switch and switch fabric operations.

In embodiments involving a switching system comprising a plurality of switching devices interconnected by a switch fabric, an Ethernet packet from a first network link enters a first switching device and a tag is added to the packet. The tagged packet is sent to the switch fabric, and the tagged packet is forwarded to a second switching device based on information in the tag. The second switching device then removes the tag and transmits the Ethernet packet via an appropriate second network link.

Since a tagged packet requires more bandwidth than an untagged packet, ports of network devices coupled to the switch fabric are overclocked, in an embodiment, so that packet throughput over the switch fabric at least matches packet throughput seen at ports coupled to network links. Overclocking, however, typically leads to higher power consumption.

Embodiments of the present disclosure generally relate to MAC framing rules that satisfy the 100GBASE physical coding sublayer (PCS) restrictions while reducing the amount of overclocking required. For example, MAC framing rules described below reduce IPGs, which reduces required amounts of overclocking, at least in some embodiments and/or scenarios.

The MAC device 102 passes data to the PHY device 104 in 8 byte units (or blocks) over the CGMII interface as defined by IEEE 802.3, according to an embodiment. In other embodiments, the MAC device 102 passes data to the PHY device 104 in units/blocks of other suitable lengths. The PHY device 104 encodes blocks received via the CGMII interface into a 66-bit block including 64 bits of data (8 data bytes) and 2 control bits, according to an embodiment. In other embodiments, the PHY device 104 encodes blocks received via the CGMII interface into other blocks of other suitable lengths and/or with other suitable numbers of control bits.

Figure 2:
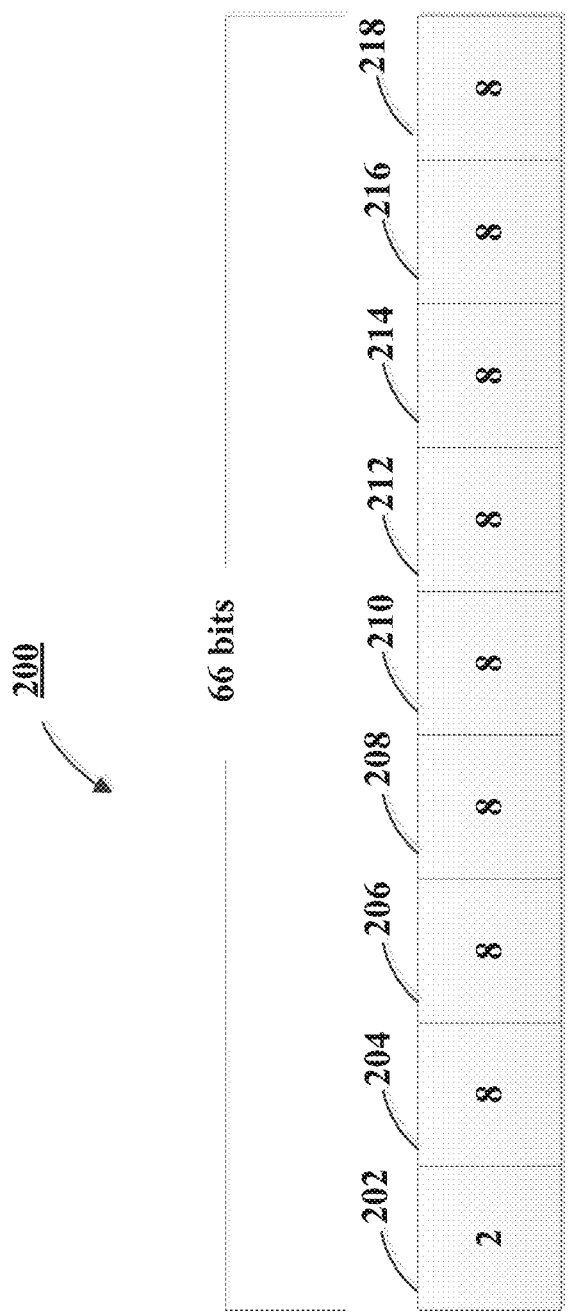
FIG. 2 is a schematic illustration of a 66-bit data block as used by a 100 Gigabit Media Independent Interface (CGMII), according to an embodiment.

FIG. 2 is a schematic illustration of an example 66-bit data block 200 as used by the PHY device 104, according to an embodiment. The data block 200 includes two control bits 202 and eight data bytes contained in blocks 204-218. The control bits 202 may provide information regarding the content of blocks 204-218. For example, a two bit pattern {0,1} contained in control bits 202 may indicate that blocks 204-218 each contain data bytes, according to an embodiment. As another example, a two bit pattern {1, 0} contained in block 202 may indicate that not all of blocks 202-218 contain data bytes. In one example, blocks 204-208 may contain data bytes while blocks 210-218 may contain control information and/or idle bytes, according to an embodiment.

Figure 3:
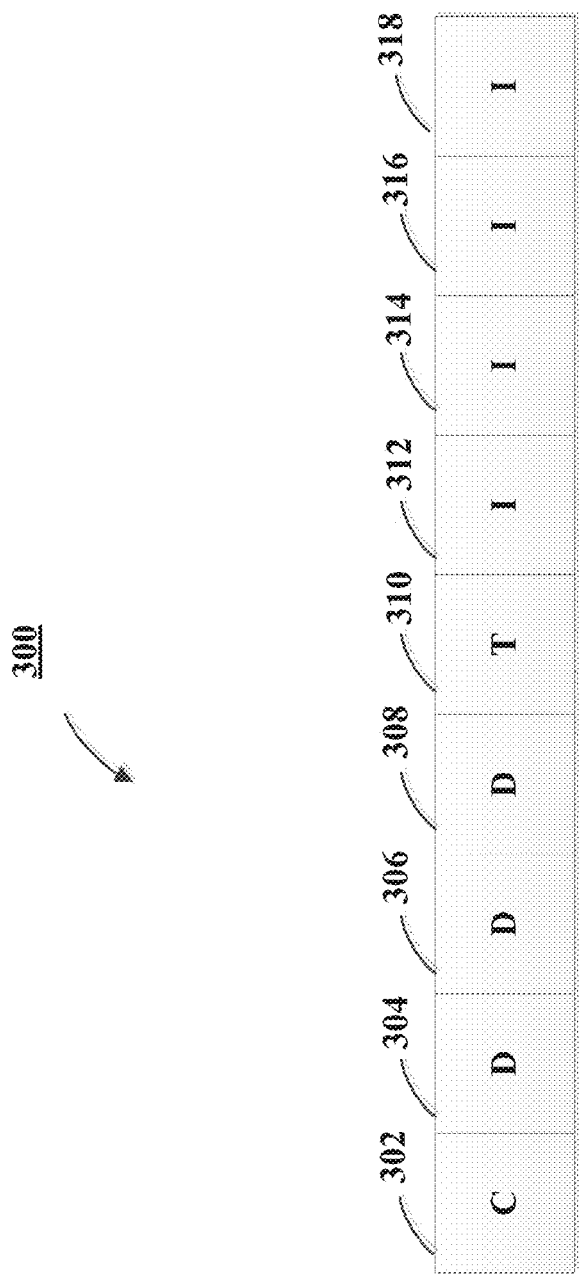
FIG. 3 is a schematic illustration of a 66-bit CGMII block containing data bytes, control information, and idle bytes, according to an embodiment.

FIG. 3 is a schematic illustration of a 66-bit block 300 containing data bytes, control information, and idle bytes, according to an embodiment. In this illustration, block 302 includes the above-described 2 bits of control information. Each of blocks 304-308, in this example, contains data bytes. The data bytes in blocks 304-308 may correspond to the end of a data packet, for example. Block 310 containing the "T" symbol represents a termination byte occurring at the end of the data packet. The symbol "I" shown in blocks 312-318 represent idle bytes that are inserted to complete the 66-bit block, in an embodiment.

Figure 4:
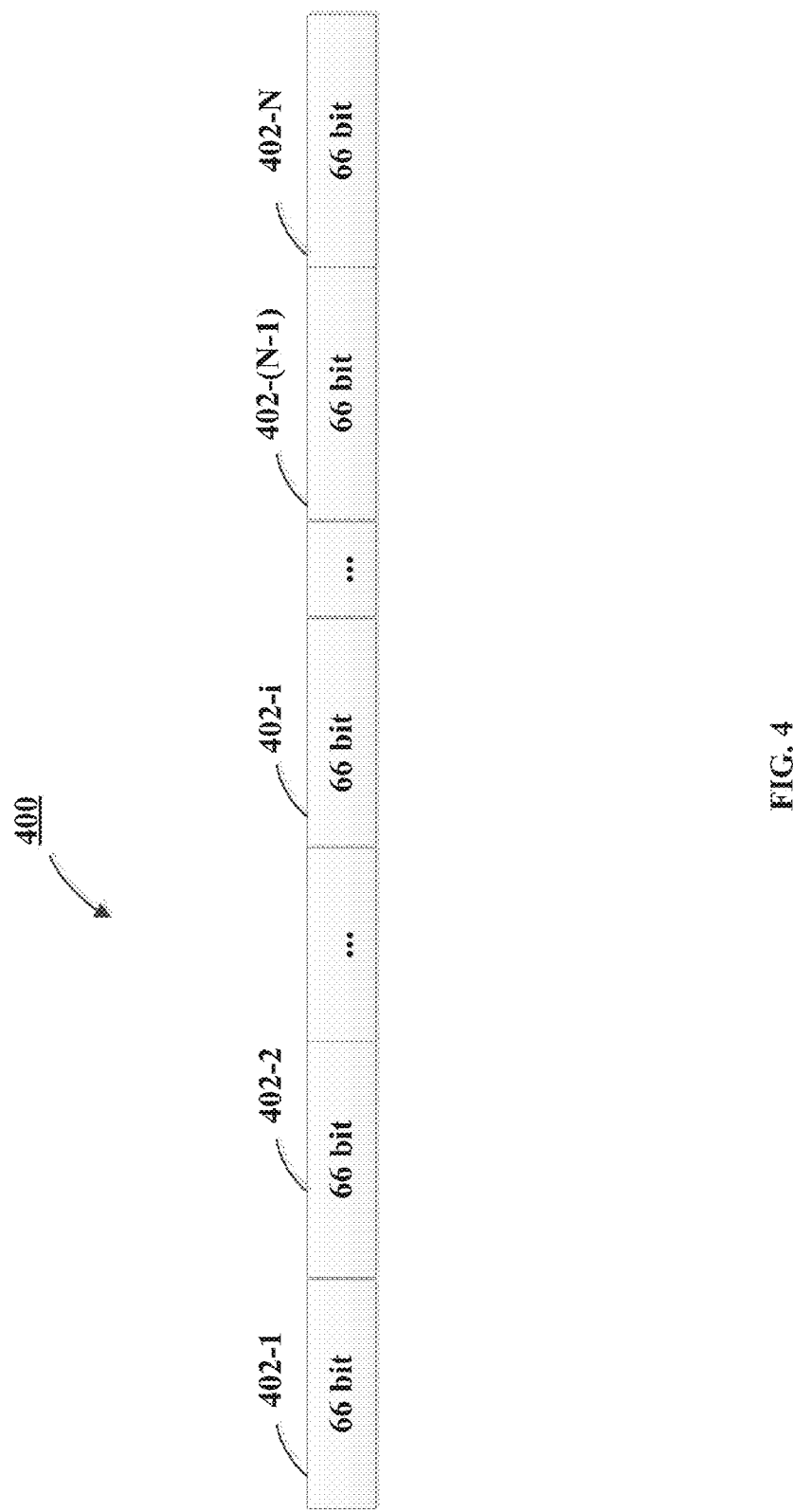
FIG. 4 is a schematic illustration of an Ethernet frame that spans a plurality of N CGMII blocks, according to an embodiment.

An Ethernet frame may span a plurality of 66-bit blocks. FIG. 4 is a schematic illustration of an Ethernet frame that spans a plurality of 66-bit blocks, according to an embodiment. In this example, the plurality of 66-bit blocks contains N blocks, wherein N is a non-zero integer greater than 1. The 66-bit blocks are labeled 402-1, 402-2, . . . , 402-N.

Block 402-1 of FIG. 4 contains data bytes corresponding to the beginning of the Ethernet frame, in an embodiment. For example, block 402-1 includes 8 bytes of preamble information, including for example, a start frame byte, according to an embodiment. Blocks 402-2 through 402-(N−1) contain Ethernet frame payload bytes, and block 402-N contains an end of a data packet along with control information and idle bytes as illustrated, for example, in FIG. 3, according to an embodiment. In some embodiments, block 402-N contains all idle bytes that serve as an IPG or as part of an IPG. In some embodiments, block 402-N contains fewer than 8-bytes of IPG.

Figure 5:
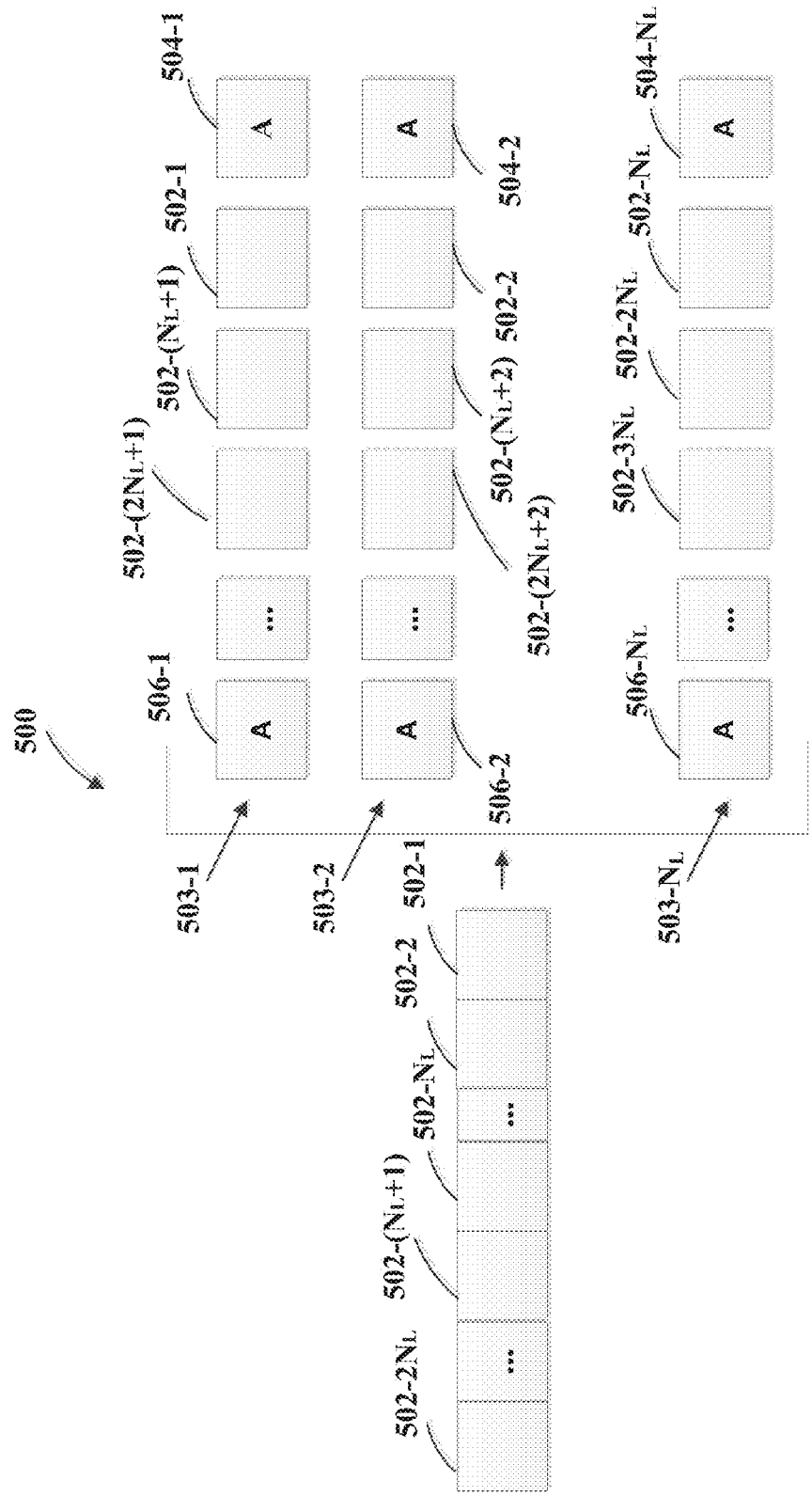
FIG. 5 is a schematic illustration of a technique for distributing 66-bit blocks into virtual lanes, according to an embodiment.

The 66-bit blocks are distributed in a round robin fashion into a number of virtual lanes. FIG. 5 is a schematic illustration of a technique 500 for distributing N 66-bit blocks of an Ethernet frame into virtual lanes, according to an embodiment. In this example, there are $N_L$ virtual lanes. Thus, the N blocks that make up an Ethernet frame are partitioned into $N_L$ groups corresponding to the $N_L$ number of virtual lanes. In this example, block 501-1 is distributed to a first virtual lane 503-1, block 502-2 is distributed to a second virtual lane 503-2, and the process continues until block 502-$N_L$ is distributed to a virtual lane 503-$N_L$. The process then continues by distributing block 502-($N_L$+1) to virtual lane 503-1, block 502-($N_L$+2) to virtual lane 503-2, etc. The process continues until block 502-($2N_L$) is distributed to virtual lane 503-$N_L$. The process then continues with block 502-($2N_L$+1) being distributed to virtual lane 503-1, block 502-($2N_L$+2) being distributed to virtual lane 503-2, etc. As an illustrative example embodiment, the number of virtual lanes is $N_L$=20. In other embodiments, the number of virtual lanes $N_L$ is another suitable value.

After a certain number of blocks have been distributed to the virtual lanes 503, an alignment marker is inserted into each virtual lane. In this example, after M 66-blocks have been distributed to each of the virtual lanes, an alignment marker, indicated by the symbol "A" is inserted. For example, FIG. 5 illustrates alignment markers 504 inserted into the virtual lanes 503, and after M blocks have been distributed, alignment marks 506 are inserted into the virtual lanes 503. In an embodiment, M is the value 16383. In other embodiments, M is another suitable value.

After the alignment markers have been inserted, the round robin process of distributing blocks 502 resumes In an embodiment, the alignment marker may be different for each of the $N_L$ virtual lanes. For example, in some embodiments in which there is no guarantee via which virtual lane any given piece of data will be transported, a receiver receiving the data streams needs the information obtained from having distinct alignment markers in order to reorder the virtual lanes. The 66-bit blocks on the $N_L$ lanes are then bit muxed and transmitted over a suitable number of physical lanes. In some embodiments, there are 4 or 10 physical lanes. In other embodiments, there are other suitable numbers of physical lanes. In some embodiments, signals are transmitted via the physical lanes by a serializer/deserializer such as SERDES 110 shown in FIG. 1.

In an embodiment, in order to make room for periodic insertion of alignment markers, idle bytes are removed from the data stream from time to time. In some embodiments, idle bytes additionally or alternatively are removed because IEEE 802.3 allows network traffic to run+/−50 ppm faster or slower than the nominal rate. Thus, if the MAC device 102 outputs data slightly faster than a speed at which the PHY device 104 is running then some idle bytes are removed to compensate for the frequency difference.

IEEE 802.3 requires that the start of a packet is on the first byte of the CGMII. This restricts the MAC device 102 from placing some arbitrary number of idle bytes between packets. For example if a packet is p bytes long, the number of idle bytes between that packet and the next packet can only be in increments of 8n−(p mod 8), where n>=1. When n=1, the number of IPG bytes is 1-8 bytes. By increasing the value of n, the number of IPG bytes increases. For example, with n=2, the number of IPG bytes is 9-16 bytes.

According to conventional systems, the MAC implements a deficit idle count rule according to IEEE 802.3 to determine whether greater or fewer than an average number of idle bytes should be added to any particular IPG. According to this rule a counter is maintained. The counter is increased for each idle byte deleted and is decreased for each byte added. The count is bounded to be between 0 and 7 inclusive.

In conventional systems, the idle count rule is implemented so as to achieve an average IPG of 12 bytes for a 100% occupied network. Per the above constraints it is not possible to insert 12 bytes IPG after all packets. Assuming a 100% occupied network with an expectation of an average of 12 bytes IPG, the deficit idle count rule can be met by choosing n to be 1 or 2 for 8n−(p mod 8). By a particular choice of n=1 or 2, as a function of the deficit idle count (DIC), various values of the average number of idle bytes in an IPG may be implemented. Table I (below) shows the number of bytes in the IPG for all combinations of p mod 8 packet size and deficit idle count (DIC) to average 12 bytes of IPG.

TABLE I

Number of idle bytes vs. p and DIC to achieve an average 12 byte IPG

| | p mod 8 (12 byte IPG) | | | | | | | |
|---|---|---|---|---|---|---|---|---|
| DIC | 7 | 6 | 5 | 4 | 3 | 2 | 1 | 0 |
| 0 | 9 | 10 | 11 | 12 | 5 | 6 | 7 | 8 |
| 1 | 9 | 10 | 11 | 12 | 13 | 6 | 7 | 8 |
| 2 | 9 | 10 | 11 | 12 | 13 | 14 | 7 | 8 |
| 3 | 9 | 10 | 11 | 12 | 13 | 14 | 15 | 8 |
| 4 | 9 | 10 | 11 | 12 | 13 | 14 | 15 | 16 |
| 5 | 17 | 10 | 11 | 12 | 13 | 14 | 15 | 16 |
| 6 | 17 | 18 | 11 | 12 | 13 | 14 | 15 | 16 |
| 7 | 17 | 18 | 19 | 12 | 13 | 14 | 15 | 16 |

Note that the sum of each column divided by 8 equals 12 and thus gives an average IPG length of 12 bytes.

FIG. 6a is a schematic illustration of a first choice 600a for a number of bytes to be inserted when p mod 8=2, according to an embodiment. This choice corresponds to the top two entries of the third column from the right in Table I corresponding to the values DIC=0 and 1. As shown in FIG. 6a, block 602a is a two-bit control block, and blocks 604a and 606a correspond to two data bytes left over when p exceeds 8 such that p mod 8=2. Block 608a is a terminate byte, and blocks 610a-618a are idle bytes. The five idle bytes in blocks 610a-618a along with the terminate byte of block 608a together form the 6-byte IPG.

FIG. 6b is a schematic illustration of a second choice 600b for a number of bytes to be inserted when p mod 8=2, according to an embodiment. This choice corresponds to the bottom six entries of the third column from the right in Table I corresponding to the values DIC=2-7. In FIG. 6b, the first 66-bit block containing blocks 602b-618b correspond to blocks 602a-618a of FIG. 6a. The IPG may be increased by adding a second 66-bit block filled with idle bytes. Such a second block of idles is illustrated on the right hand side of FIG. 6b and contains blocks 620b-636b. Block 620b contains two control bits and blocks 622b-636b contain idles. The five idle bytes in blocks 610b-618b along with the terminate byte of block 608b together with the eight idle bytes of blocks 622b-636b together form a 14-byte IPG.

If idle bytes have to be dropped from an IPG, they must be dropped in 8-byte increments since the CGMII passes data in 8-byte increments and the encoding process operates across 8 bytes and expects the start of packet byte to be on the first byte of the CGMII. It is not possible to have zero bytes of IPG between packets, therefore only an IPG with 9 bytes or more can drop 8 bytes of IPG.

It is possible to "steal" IPG (e.g., for the purpose of including tag bytes, to include an alignment marker, or to compensate for frequency differences between the MAC and the PHY) by requiring the IPG to average some number less than 12 bytes. The smallest that can be achieved using the DIC is 9 bytes.

If the packet length is p mod 8=0 for all packets it is not be possible to delete idles as all IPGs would have 8 bytes as illustrated in Table II (below) which shows the number of bytes in the IPG for all combinations of p mod 8 packet size and deficit idle count (DIC) to average 8 bytes of IPG.

TABLE II

Number of idle bytes vs. p and DIC to achieve an average 8 byte IPG

| | p mod 8 (8 byte IPG) | | | | | | | |
|---|---|---|---|---|---|---|---|---|
| DIC | 7 | 6 | 5 | 4 | 3 | 2 | 1 | 0 |
| 0 | 1 | 2 | 3 | 4 | 5 | 6 | 7 | 8 |
| 1 | 9 | 2 | 3 | 4 | 5 | 6 | 7 | 8 |
| 2 | 9 | 10 | 3 | 4 | 5 | 6 | 7 | 8 |
| 3 | 9 | 10 | 11 | 4 | 5 | 6 | 7 | 8 |
| 4 | 9 | 10 | 11 | 12 | 5 | 6 | 7 | 8 |
| 5 | 9 | 10 | 11 | 12 | 13 | 6 | 7 | 8 |
| 6 | 9 | 10 | 11 | 12 | 13 | 14 | 7 | 8 |
| 7 | 9 | 10 | 11 | 12 | 13 | 14 | 15 | 8 |

Thus, the right hand column of Table II, corresponding to p mod 8=0 is a pathological case in which all packets would have IPG=8. As mentioned above, in order to "steal" IPG (e.g. to use some IPG bytes for other purposes) it must be taken in 8-byte increments. Thus, the p mod 8=0 column of Table II indicates that a zero IPG would result from such "stealing" of IPG in this case.

The smallest average IPG that can be achieved using the conventional DIC rules, therefore, is an average IPG of 9 bytes as illustrated in Table III (below). Table III shows the IPG inserted to average 9 bytes of IPG. There are no pathological cases since any deficits accumulated must eventually be compensated by an IPG of 9 bytes or greater.

TABLE III

Number of idle bytes vs. p and
DIC to achieve an average 9 byte IPG

| DIC | p mod 8 (9 byte IPG) | | | | | | | |
|---|---|---|---|---|---|---|---|---|
| | 7 | 6 | 5 | 4 | 3 | 2 | 1 | 0 |
| 0 | 9 | 2 | 3 | 4 | 5 | 6 | 7 | 8 |
| 1 | 9 | 10 | 3 | 4 | 5 | 6 | 7 | 8 |
| 2 | 9 | 10 | 11 | 4 | 5 | 6 | 7 | 8 |
| 3 | 9 | 10 | 11 | 12 | 5 | 6 | 7 | 8 |
| 4 | 9 | 10 | 11 | 12 | 13 | 6 | 7 | 8 |
| 5 | 9 | 10 | 11 | 12 | 13 | 14 | 7 | 8 |
| 6 | 9 | 10 | 11 | 12 | 13 | 14 | 15 | 8 |
| 7 | 9 | 10 | 11 | 12 | 13 | 14 | 15 | 16 |

In general, the conventional approach (described above with reference to FIGS. 6a, 6b, and Tables I-III) for determining the IPG (having a particular average value) is not optimal in that the conventional approach adds more idle bytes than are needed. The following disclosed embodiments provide an improvement over the conventional approach by only adding additional idle bytes as needed. As such, throughput can be increased.

In an embodiment, IPGs with a minimal number of idle bytes (e.g., such as illustrated in FIG. 6a) are utilized as often as possible, whereas an IPG having an extra block of idle bytes (e.g., such as illustrated in FIG. 6b) is utilized periodically. In an embodiment, when dealing with large packet an IPG having two or more blocks of idle bytes (not shown) is utilized periodically.

According to an embodiment, a rule for inserting IPGs is expressed as follows:

(1) initialize a variable n=1;

(2) for a plurality of data packets, output a number $N_I = 8*n - (p \mod 8)$ bytes of IPG;

(3) increment n is by 1 after every q number of CGMII data transfers (i.e., 8-byte transfers), where q is defined below; and (4) reset n to 1 after $N_I = 8*n - (p \mod 8)$ bytes of IPG have been output.

Optionally, (5) if the network is not 100% occupied and 8 bytes of idles are output because there is no data to output, the CGMII counter (#3 above) can be reset to 0 so that n remains equal to 1 independent of how many CGMII data transfers occur.

For random packet lengths, the average IPG according to the above rule will be 4.5 bytes. The worst case will be for all packets to have an IPG of 7 bytes. This is still better than the conventional technique discussed above where the IPG takes on a smallest average value of 9 bytes.

According to an embodiment, if there is a frequency difference between the MAC device 102 and the PHY device 104, there will be a certain amount of misalignment that can be periodically corrected by inserting a single block (i.e., for n=1) of idle bytes. In an embodiment, q is determined based on the frequency mismatch between the MAC device 102 and the PHY device 104. In an embodiment, q is determined based on a pre-determined requirement to insert alignment markers after a plurality of 66-bit blocks have been transferred. In some embodiments, it is advantageous to output IPGs having a minimum number of idle bytes until a number of transfers has exceeded the number q.

According to some embodiments, the requisite idle bytes cannot be inserted anywhere, but rather idle bytes may only be inserted along in IPGs. Therefore, in some cases it is necessary to insert more than a single block of idle bytes. For example, when transferring large packet sizes, the following situation may be encountered. The number of transferred 8-byte blocks may be below q before a given (large) packet is transferred but, due to the large size of the packet to be transferred, the number of 8-byte blocks may exceed q twice by the time the packet has finished being transferred. In this case, n is set as n=3, and two additional blocks of idle bytes are included in the IPG. In other situations, a packet may be so large that n=4 and three blocks of idles are to be included in the IPG. In other cases, n may take on other suitable values.

Optional rule number (5) is used when the network is not completely utilized. In this case, n maintains a value of n=1 and IPGs are generated having a minimal number of idle bytes. This situation is encountered, as described above, for packets having random lengths in which case the average IPG is 4.5 bytes.

As described above, in certain embodiments, one alignment marker is inserted after the transfer of each set of 16383 66-bit blocks. In the following illustrative example, it is assumed that 20 virtual lines are utilized. In other embodiments, however, other suitable numbers of virtual lanes are utilized, resulting in other suitable values of the parameter q. Since there are 20 virtual lanes, 20 8-byte idles are to be removed for every 20×16384 8-byte CGMII transfers. Assuming the MAC is 50 parts per million (ppm) faster than nominal and the PHY is 50 ppm slower than nominal an additional 2×50/1000000×20×16384=33 bytes are to be removed. Hence theoretically only 20+33=53 8-byte idles are to be removed per 20×16384 8-byte CGMII transfers. Hence q=20*16384/53 which is approximately q≈6000. Therefore an 8-byte idle is inserted after roughly 6000 CGMII 8-byte transfers. For actual implementations q may be set more conservatively (e.g., once per 2000 8-byte CGMII transfers, etc.).

Using conventional deficit idle count rules where n=2 for about half the IPGs for random packets with average length of 800 bytes, n=2 will occur roughly once per 200 8-byte CGMII transfers. For the cases where the packets are always short, say, with an average 80 bytes, using conventional deficit count rules, n=2 occurs about once per 20 8-byte CGMII transfers. Thus, according to the above estimates of q≈6000 or q≈2000, the new rule adds extra idles far less often (e.g., once every 2000-6000 8-byte CGMII transfers) as compared to the conventional DIC rules (in which extra idles are added once per every 20-200 8-byte CGMII transfers).

Figure 7:
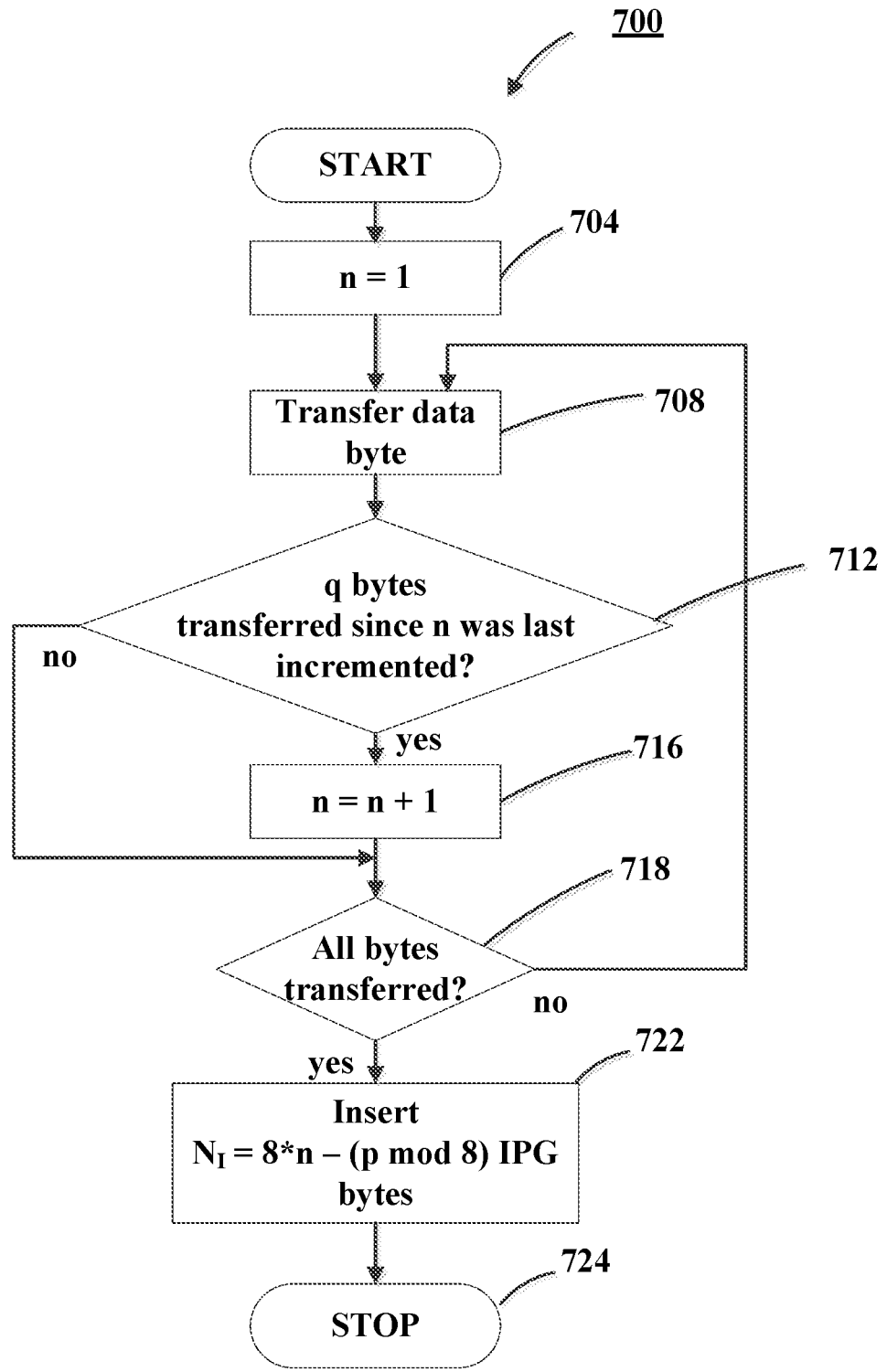
FIG. 7 is a flowchart illustrating a method of inserting idle bytes between packets transferred from a MAC layer device to a PHY device, according to an embodiment.

FIG. 7 is a flow diagram illustrating an example method 700 of transferring a frame from a MAC to a PHY and generating an IPGs, according to an embodiment. At block 704, the variable n discussed above is initialized. For example, in an embodiment, n is set to one. At block 708, a byte of a data packet is transferred from the MAC device 102 to the PHY device 104. Next, at block 712, it is determined whether q bytes have been transferred since n was last incremented. If q bytes have not been transferred since the n was last incremented, the flow returns to block 708, at which another byte is transferred.

On the other hand, if it is determined at block 712 that q bytes have been transferred since the last incrementation of n, the flow proceeds to block 716 at which the variable n is incremented (e.g., n=n+1). At block 718, it is determined whether all bytes of the data packet have been transferred. If all bytes of the data packet have not been transferred, the flow returns to block 708, at which another byte is transferred.

On the other hand, if it is determined at block 718 that all bytes of the data packet have been transferred, the flow proceeds to block 722. At block 722, $N_I$ idle bytes are inserted. In other embodiments, blocks are modified, the order of blocks is changed, blocks are omitted, and/or additional blocks are added. For example, in one embodiment, a block size $N_{block}$ having a suitable size other than 8 bytes is utilized. Thus, in an embodiment, a number of idle bytes in the IPG is determined at block 722 as $N_{block}*n-(p \mod N_{block})$.

In some embodiments, the method further includes resetting n to one in conjunction with performing block 722. In further embodiments, a non-transitory computer readable storage medium having computer program instructions stored thereon is provided. The computer program instructions are such that, when executed by a processor, they cause the processor to perform the method 700 and/or any suitable variations of method 700.

In some embodiments, a MAC layer device is capable of communicating with a PHY device at different data rates specified by different interfaces. For example, a MAC layer device and a PHY device communicate at 10 megabits per second (Mbps) or 100 Mbps using a Media Independent Interface (MII), at 1 gigabit per second (Gbps) using a 1 Gigabit Media Independent Interface (GMII), or at 10 Gbps using a 10 Gigabit Media Independent Interface (XGMII), in various embodiments. In other embodiments, further interfaces also include a 40 Gigabit Media Independent Interface (XLGMII) and a 100 Gigabit Media Independent Interface (CGMII).

In some embodiments, however, portions of the PHY device can only operate at a single data rate. For example, in some embodiments, the PHY device includes a physical coding sublayer (PCS), such as a 10GBASE-R PCS, that only operates at 10 Gbps using XGMII, or a 100GBASE-R PCS that only operates at 100 Gbps using CGMII. In some of these embodiments, the PHY includes a converter that converts 10 Mbps or 100 Mbps MII data streams, 1 Gbps GMII data streams, 10 Gbps XGMII data streams, and/or 40 Gbps XLGMII data streams, to 100 Gbps CGMII data streams.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any tangible, non-transitory computer readable memory such as on a magnetic disk, an optical disk, or other storage medium, in a RAM or ROM or flash memory, processor, hard disk drive, optical disk drive, tape drive, etc.

When implemented in hardware, the hardware may comprise one or more of discrete components, an integrated circuit, an application-specific integrated circuit (ASIC), a programmable logic device, etc.

Embodiments of the present disclosure may be embodied in any type of network interface device used in a communication system including, for example, devices used in communication systems including or coupled to a wired or wireless local area network (LAN) or a wired or wireless wide area network (WAN), the Internet, cable and/or satellite based communication systems, etc.

While the present invention has been described with reference to specific examples, which are intended to be illustrative only and not to be limiting of the invention, changes, additions and/or deletions may be made to the disclosed embodiments without departing from the scope of the claims.

What is claimed is:

1. A method of transferring, from a media access control (MAC) layer device to a physical layer (PHY) device, a plurality of data packets, the method comprising:
    setting, at the MAC layer device, a parameter n to have an initial value of one;
    transferring, from the MAC layer device to the PHY device via a media-independent interface, the plurality of data packets, including incrementing the parameter n for every q data bytes that are transferred, wherein q is a finite integer; and
    for each data packet transferred,
        setting, at the MAC layer device, a number of idle bytes $N_I$ of an interpacket gap (IPG) having $N_I=N_{block}*n-(p \mod N_{block})$ idle bytes, wherein p is an integer denoting a length of the data packet in bytes and $N_{block}$ is a blocking size in bytes,
        inserting, by the MAC layer device, the $N_I$ bytes of the IPG after data bytes in the data packet are transferred in order to create a time gap between the data packet and a subsequent data packet, and
        resetting, at the MAC layer device, the parameter n to one.

2. The method of claim 1, wherein $N_{block}=8$.

3. The method of claim 2, wherein an average value of $N_I$ is less than eight.

4. The method of claim 3, wherein an average value of $N_I$ is 4.5 for randomly varying data packet lengths.

5. The method of claim 2, further comprising maintaining n=1 when there are no data packets to output.

6. The method of claim 1, further comprising determining the parameter q based on a rate at which alignment markers are to be inserted.

7. The method of claim 6, further comprising determining the parameter q further based on a number of virtual lanes to be utilized.

8. The method of claim 6, further comprising determining the parameter q further based on a maximum number of idle bytes to be removed due to a difference between a clock of the MAC layer device and a clock of the PHY device.

9. An apparatus, comprising:
    a media access control (MAC) layer device;
    a physical layer (PHY) device coupled to the MAC layer device;
    wherein the MAC layer device includes one or more integrated circuit devices configured to:
        set a parameter n to have an initial value of one,
        transfer, from the MAC layer device to the PHY device via a media-independent interface, a plurality of data packets,
        increment the parameter n for every q data bytes that are transferred, wherein q is a finite integer, and
        for each data packet transferred,
            set a number of idle bytes $N_I$ for an interpacket gap (IPG) having $N_I=N_{block}*n-(p \mod N_{block})$ idle bytes, wherein p is an integer denoting a length of the data packet in bytes and $N_{block}$ is a blocking size in bytes,
            insert the $N_I$ bytes of the IPG after data bytes in the data packet are transferred in order to create a time gap between the data packet and a subsequent data packet, and
            reset the parameter n to one.

10. The apparatus of claim 9, wherein $N_{block}=8$.

11. The apparatus of claim 10, wherein an average value of $N_I$ is less than eight.

12. The apparatus of claim 11, wherein an average value of $N_I$ is 4.5 for randomly varying data packet lengths.

13. The apparatus of claim 10, wherein the one or more integrated circuits are further configured to maintain n=1 when there are no data packets to output.

14. The apparatus of claim 9, wherein the one or more integrated circuits are further configured to determine q based on a rate at which alignment markers are to be inserted.

15. The apparatus of claim 14, wherein the one or more integrated circuits are further configured to determine q further based on a number of virtual lanes to be utilized.

16. The apparatus of claim 14, wherein the one or more integrated circuits are further configured to determine q further based on a maximum number of idle bytes to be removed due to a difference between a clock of the MAC layer device and a clock of the PHY device.

17. A non-transitory computer readable storage medium having computer program instructions stored thereon that, when executed by one or more processors, cause the one or more processors to implement a method of transferring, from a media access control (MAC) layer device to a physical layer (PHY) device, a plurality of data packets, the method comprising:

setting a parameter n to have an initial value of one;

transferring, from the MAC layer device to the PHY device via a media-independent interface, the plurality of data packets, including incrementing the parameter n for every q data bytes that are transferred, wherein q is a finite integer; and for each data packet transferred, setting a number of idle bytes $N_I$ of an interpacket gap (IPG) having $N_I = N_{block} * n - (p \bmod N_{block})$ idle bytes, wherein p is an integer denoting a length of the data packet in bytes and $N_{block}$ is a blocking size in bytes, inserting the $N_I$ bytes of the IPG after data bytes in the data packet are transferred in order to create a time gap between the data packet and a subsequent data packet, and resetting the parameter n to one.

18. The non-transitory computer readable storage medium claim 17, wherein $N_{block} = 8$.

19. The non-transitory computer readable storage medium claim 17, further comprising computer program instructions stored thereon that, when executed by one or more processors, cause the one or more processors to determine q further based on a number of virtual lanes to be utilized.

20. The non-transitory computer readable storage medium claim 17, further comprising computer program instructions stored thereon that, when executed by one or more processors, cause the one or more processors to determine q further based on a maximum number of idle bytes to be removed due to a difference between a clock of the MAC layer device and a clock of the PHY device.

\* \* \* \* \*